Patented Jan. 24, 1933

1,895,195

UNITED STATES PATENT OFFICE

HYMAN LIMBURG, OF AMSTERDAM, NETHERLANDS, ASSIGNOR, BY MESNE ASSIGNMENTS, TO THE FLINTKOTE CORPORATION, OF BOSTON, MASSACHUSETTS, A CORPORATION OF MASSACHUSETTS

PROCESS OF PRODUCING SULPHONIC ACIDS

No Drawing. Application filed November 15, 1928, Serial No. 319,729, and in the Netherlands November 15, 1927.

My invention relates to the production of water soluble sulphonic acids and more particularly to the production of such acids from mineral oils or mineral oil fractions.

The sulphonic acids obtained in accordance with my present invention are useful for a variety of purposes, although they find particular advantage as agents for producing and/or stabilizing aqueous dispersions of various substances, such as asphalt, rubber, tar, mineral and vegetable oils and the like. While numerous properties characterize the sulphonic acids produced in accordance herewith, they may be generally identified as being of relatively high molecular weight depending largely upon the boiling point characteristics of the mineral oil from which they are derived; soluble in water; insoluble in benzene and similar hydrocarbon oils; form calcium salts soluble in water and in solutions of calcium chloride, this latter property being particularly desirable since by virtue thereof the sulphonic acid may be employed to produce aqueous dispersions of bitumens, etc., which are quite stable, and resistant to the action of bivalent and multivalent positive ions, and similar influences, and such dispersions also resist to a high degree the action of low temperatures ordinarily sufficient to freeze the aqueous phase of the dispersion, and cause more or less coagulation of the dispersion.

The production of sulphonic acids generally is known in the art, the customary practise being to sulphonate mineral oils or mineral oil fractions of any desired character by means of sulphuric acid, oleum, or the like, and separating the so-called acid tar or acid sludge thus formed, from the oily layer. It is also known that water soluble sulphonic acids may be obtained by a purification treatment of the acid tar or sludge, and that such water soluble sulphonic acids can be used as emulsifiers and/or stabilizers for aqueous dispersions generally. Likewise, it has been proposed to isolate sulphonic acids soluble in water and in calcium chloride solution from acid tars obtained in the later stages of a multi-stage sulphonation of mineral oil, and to utilize the same in the production and/or stabilization of aqueous dispersions, generally, and for other purposes.

My present invention is concerned with improved methods for economically producing in a simpler way and in a purer condition, sulphonic acids of the type soluble in water and in acid and the calcium and other bi- or multivalent metal salts of which are soluble in water and in solutions of calcium chloride and other electrolytes. My invention further contemplates the utilization of these sulphonic acids for the commercial manufacture and/or the stabilization of aqueous dispersions of bitumen, rubber, oils and substances generally immiscible with water.

Broadly stated, my invention, insofar as it concerns the production of the said sulphonic acids, consists in treating mineral oil or mineral oil fractions prior to sulphonation thereof, in such manner as to separate the same into two fractions, one of which may be generally described as being substantially insoluble in liquid sulphur dioxide and containing hydrocarbon constituents attackable by sulphur trioxide, and $SO_3$ compounds, as well as constituents not attackable by $SO_3$ and $SO_3$ compounds; and the other of which may be generally described as being substantially soluble in liquid sulphur dioxide. The sulphonation is then, in accordance with the present invention, carried out using the first of said fractions, namely, that containing the constituents substantially insoluble in liquid sulphur dioxide. This sulphonation may be carried on either in one or more stages, but preferably by first treating the said fraction with a relatively small amount of sulphuric acid or the like, separating the acid tar from the oil, and subjecting the latter to a second treatment, either in one or more stages, with the same agent, and separating the acid tar from the second treatment. The acid tar obtained in this way contains, besides the sulphonic acids, mainly sulphuric acid. For some purposes, the acid tar may be used, as such, or after neutralization. For other purposes, however, a purification or isolation of the sulphonic acids may be necessary.

In order to extract the constituents of the mineral oil soluble in liquid sulphur dioxide from those insoluble therein, I treat the selected mineral oil, or mineral oil fraction, with a substance or a mixture of substances which dissolve therefrom the constituents soluble in liquid sulphur dioxide. Preferably, I use for this purpose, liquid $SO_2$ whereupon two separate layers are formed, one of which contains the constituents insoluble in $SO_2$ and the other of which contains the constituents soluble therein. These two layers may then be separated by simply drawing off the lower layer. The layer containing the constituents insoluble in $SO_2$ may then be subjected to any convenient treatment for the removal or release of free $SO_2$ therein, although the most convenient method is to evaporate the $SO_2$, the vapors thereof being readily recovered as by condensation, for reuse.

Instead of separating the several fractions as above described by means of liquid $SO_2$, I may use furfurol, aniline, dimethyl sulphate, or other material possessing a dissolving action upon the constituents of the mineral oil soluble in $SO_2$. Or, if desired, I may extract first with liquid $SO_2$ and then with furfurol. In certain instances, also, I may carry out the extracting treatment by suitable mixtures of the various agents above mentioned.

In any event, however, the oil fraction containing the constituents insoluble in liquid $SO_2$ and freed from $SO_2$ or other extracting agent, is then subjected to sulphonation as by means of sulphuric acid, oleum, chlorsulphonic acid, or the like. This sulphonating treatment, as will be understood by those skilled in the art, results in the formation of two layers, one of which, the upper layer, consists of oil and sulphonic acids soluble therein, and the other of which, namely, the lower layer, constitutes a so-called acid tar, containing sulphonic acids soluble in calcium chloride solution as well as in water; these sulphonic acids being the ones with which the invention particularly concerns itself. In order to finally separate these acids, the said acid tar is first separated from the upper oily layer and the sulphonic acids then separated or isolated from the acid tar and purified, if desired, in any convenient manner. Certain oil soluble sulphonic acids may also be separated from the upper oily layer, but the production of these oil soluble sulphonic acids and the utilization thereof, constitutes subject matter of a separate application.

In one specific embodiment of my invention, I may treat a Venezuelan oil fraction of a boiling point between 300 and 350° C. with about 300% of its own weight of liquid sulphur dioxide. From the two layers thus formed, I draw off the lower layer, and then evaporate the free $SO_2$ from the upper layer. Then I treat the oil remaining after the removal of the $SO_2$ with about 10% of its weight of 20% oleum, the acid tar formed being then separated from the oil, and the latter is then treated with 50% by weight of 20% oleum. The acid resulting from this second treatment is separated or removed from the oil and diluted with 20% by volume of water. The sulphonic acids which are thus precipitated, when cooled to normal temperatures so as to take the form of rather hard lumps, are pressed out under pressure of about 4000 pounds per square inch, mixed with a small amount of water, and again pressed out.

In another embodiment of my invention, I may treat Mexican spindle oil with about 250% by weight of furfurol. The two layers formed are separated and that part of the oil not soluble in furfurol is treated with about 10% strong sulphuric acid. The acid sludge is removed from the oil, the latter being then treated with 40% by weight of 10% oleum. The acid tar formed in the last treatment is separated from the oil and diluted with ten times its own weight of water. A sufficient quantity of $Ca(OH)_2$ is added to precipitate the excess sulphuric acid, the precipitate being then separated from the liquid, the latter being a solution of the desired sulphonic acids in water.

The foregoing examples are only given as illustrations, for my invention does not depend upon the particular way of, or the particular substances used in, removing the hydrocarbons soluble in liquid $SO_2$ from the other oil constituents, nor does it depend upon the way in which or the particular substances used for converting the latter into sulphonic acids.

The sulphonic acids obtained in the manner described are useful for several purposes. One of the most important applications is the use as emulsifying and stabilizing agents in the manufacture or stabilization of aqueous dispersions of substances substantially insoluble in water, such as mineral oil, asphalt, tar, paraffin, rubber, vegetable oil, etc. The preparation or stabilization of such emulsions can be varied in several ways. Thus, the emulsion can be prepared by adding the phase to be emulsified containing a small amount of an emulsifier soluble in that phase as for instance, naphthenic acid, oleic acid, sulphonic acid, or the like, to an aqueous solution of the alkali sulphonates containing a suitable excess of alkali hydroxide, carbonate, silicate or the like, whilst stirring. Or the sulphonic acids or their salts can be added to an emulsion prepared in known manners. Again the emulsion can be prepared by emulsifying the non-aqueous phase in an aqueous solution of the sulphonic acids or their salts, with a colloid mill. The sulphonic acids or their salts are capable of increasing the stability of natural dispersions, for example, rubber latex. In these cases, the stabilizer is added to the dispersion in its natural state. In the same way, mixtures of natural and artificial dispersions can be stabilized. In all those cases, the quantity of sulphonic acid used depends upon the nature of the dispersion and upon the desired degree of stability.

With the emulsions so obtained all manipulations known in the art may be effected. Thus, for instance, they may be homogenized, mixed with other finely divided substances, the electrical charge of the particles may be changed, etc. The sulphonic acids may be used for other purposes also, such as breaking of emulsions of the water in oil type, as tanning agents, as cleaning agents, as wetting agents and so on.

I claim as my invention:

1. A process for producing sulphonic acids which comprises separating mineral oil of relatively high boiling point into the constituents thereof which are soluble in liquid sulphur dioxide and the constituents thereof which are insoluble in liquid sulphur dioxide, subjecting the insoluble constituents in the absence of free sulphur dioxide to sulphonation at a temperature above normal to produce water soluble sulphonic acids whose calcium salts are soluble in water and in calcium chloride solutions, separating the upper layer from the lower layer containing said sulphonic acids, and recovering the sulphonic acids contained therein.

2. A process for producing sulphonic acids from mineral oil of relatively high boiling point which comprises treating the oil with liquid sulphur dioxide and separating the constituents of the oil which are soluble in liquid sulphur dioxide from those which are insoluble in liquid sulphur dioxide, freeing the insoluble constituents of sulphur dioxide, then subjecting the insoluble constituents in the absence of free sulphur dioxide to sulphonation at a temperature above normal to produce water soluble sulphonic acids whose calcium salts are soluble in water and in calcium chloride solutions, separating the upper layer from the lower layer containing said sulphonic acids, and recovering the sulphonic acids contained therein.

3. A process for producing sulphonic acids which comprises separating mineral oil of relatively high boiling point into the constituents thereof which are soluble in liquid sulphur dioxide and the constituents thereof which are insoluble in liquid sulphur dioxide, subjecting the insoluble constituents in the absence of free sulphur dioxide to sulphonation at a temperature above normal to produce water soluble sulphonic acids whose calcium salts are soluble in water and in calcium chloride solutions, separating the upper layer from the lower layer containing said sulphonic acids, diluting said lower layer with water and adding a base to precipitate the free sulphuric acid present, and separating the solution of the sulphonic acids.

4. A process for producing sulphonic acids which comprises separating mineral oil of relatively high boiling point into the constituents thereof which are soluble in liquid sulphur dioxide and the constituents thereof which are insoluble in liquid sulphur dioxide, subjecting the insoluble constituents in the absence of free sulphur dioxide to sulphonation at a temperature above normal to produce water soluble sulphonic acids whose calcium salts are soluble in water and in calcium chloride solutions, separating the upper layer from the lower layer containing said sulphonic acids, diluting said lower layer with water and cooling the diluted solution to precipitate sulphonic acids, and separating the precipitated acids from the solution.

In testimony whereof I affix my signature.

HYMAN LIMBURG.